Patented July 24, 1951

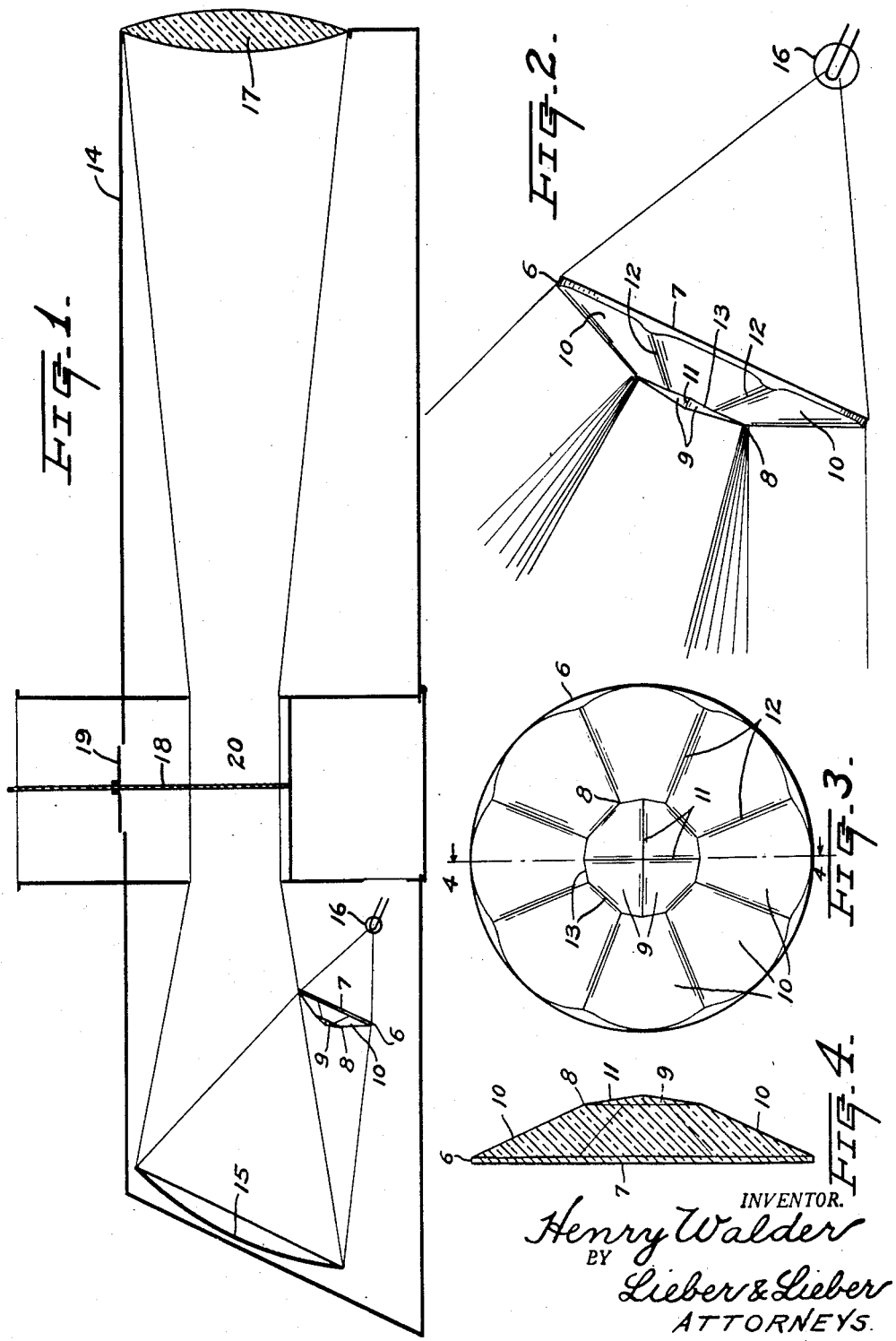
July 24, 1951  H. WALDER  2,561,895
LENS WITH CONVEXLY TRANSVERSELY
ROUNDED SECTOR DEFINING RADII
Filed July 12, 1946
INVENTOR.
Henry Walder
BY Lieber & Lieber
ATTORNEYS.

2,561,895

UNITED STATES PATENT OFFICE 2,561,895

LENS WITH CONVEXLY TRANSVERSELY ROUNDED SECTOR DEFINING RADII

Henry Walder, Milwaukee, Wis.

Application July 12, 1946, Serial No. 683,090

2 Claims. (Cl. 240—106.1)

The present invention relates generally to improvements in the art of illumination, and relates more particularly to improvements in the construction and use of lenses especially adapted for light projecting purposes in directing light passing therethrough in a desired manner while uniformly intensifying the same.

A primary object of the invention is to provide an improved lens which is simple, durable and compact in construction, and which is particularly useful for light projection purposes.

In projecting pictures or other matter against an object such as a screen, it has heretofore been common practice to utilize a magnifying lens of the type having a flat surface on one side thereof and a convex curved surface on the opposite side. However, there are numerous disadvantages attendant the use of such ordinary lenses for the intended purpose. First, when a convex lens is used for magnifying or intensifying the light directed against the reflector, the light source must be maintained within the focal distance or length of the lens. Failure to maintain the light within the focal distance results in condensation of the light rays as they leave the lens and pass to the reflector, thereby leaving a relatively large area of the reflector surface void of the intensified light and resulting in weak projection and distortion of the image projected. It therefore follows that if a lens having a short focal length is used, the light source must be maintained relatively close to the lens and within the focal distance to prevent condensation of the light between the lens and the reflector. However, since the light used must be of considerable intensity to be suitable for purposes of projection, especially at long range, a large amount of heat is produced thereby which is likely to damage the lens unless the latter is positioned a safe distance away from the light source, and a lens with too short a focal length cannot therefore be safely used. Furthermore, in order to enable placement of the lens a safe distance away from the hot light used for projection, the ordinary lens must be such as to have a relatively long focal length in order to spread the light and flood the reflector, and the results obtained with a lens having a long focal length are not the most desirable because of the weak magnifying effect produced thereby, thus enabling effective projection only for short distances.

It is accordingly a more specific object of this invention to provide an improved light projecting lens which obviates the disadvantages heretofore encountered.

Another specific object of the present invention is to provide an improved lens which is especially adapted for use in directing and projecting light with maximum uniformity and increased intensity over a desired area while maintaining the lens a safe distance away from the light source.

Another specific object of my invention is to provide an improved lens adapted for use in efficiently flooding the entire surface of the reflector of a film or picture projector uniformly with greatly intensified light, thereby enabling clear visual projection at long as well as short ranges.

Another specific object of this invention is to provide an improved lens for directing a greatly intensified light uniformly over the entire area of a reflector in a most effective manner whereby condensation of the light rays is minimized both before reaching and after leaving the reflector surface.

A further specific object of my present invention is to provide an improved lens having a convex area bounded by an inner and an outer series of flat surfaces.

An additional specific object of the present invention is to provide an improved lens which may be readily formed of any suitable transparent material and which is highly efficient in operation when utilized for directing and projecting intensified light rays.

These and other specific objects and advantages of the invention will be apparent from the following detailed description.

A clear conception of the various features constituting the present improvement, and of the mode of constructing and of utilizing lenses built in accordance with the invention, may be had by referring to the drawing accompanying and forming a part of this specification, wherein like reference characters designate the same or similar parts in the several views.

Fig. 1 is a diagram showing a typical advertising or projecting assemblage embodying the improved lens;

Fig. 2 is an enlarged side elevation of the improved lens associated with a light as when in normal use and showing diagrammatically the manner in which the rays are projected and diffused by the rounded corners of the improved lens between flats thereof;

Fig. 3 is a similarly enlarged plan view of the lens showing the formation of the flats or facets and also indicating the roundings at the intersections of the flat surfaces; and Fig. 4 is a central section through the lens taken along the line 4—4 of Fig. 3.

While the invention has been shown and described herein as specifically embodied in a lens adapted for use in directing light rays toward a reflector of a typical projector while intensifying the same, it is not my desire or intention to thereby unnecessarily limit or restrict the scope or utility of the improved device.

Referring to the drawing, the improved lens shown therein comprises in general, a body 6 formed of suitable transparent material having a substantially flat or plane surface 7 on one side thereof and a convex area 8 on the opposite side, the area 8 being bounded by an annular series of inner sector-shaped flat surfaces or facets 9 and an annular series of outer sector-shaped flat surfaces or facets 10 disposed at acute angles with respect to the plane surface 7. The flats or facets 9, 10 are preferably ground and highly polished and are rounded at the intersections 11, 12, and 13 thereof as clearly shown in Figs. 2 and 3. It is accordingly apparent that the improved lens may be suitably referred to as plano-convex since it has a convex area formed or provided with a series of plane surfaces.

The improved lens is especially useful in conjunction with film or picture projectors wherein it is desired to project light uniformly over a screen as distinguished from a lens primarily intended for image-forming purposes, and one typical assemblage in which the lens may be used is diagrammatically shown in Fig. 1 of the drawing. Referring to Fig. 1, the typical assemblage shown therein as embodying the improved lens comprises in general, a frame or casing 14 housing a reflector 15, the improved lens 6, and a suitable light 16 adjacent one end thereof and having an ordinary stationary projecting lens 17 at the opposite end through which the image from the slide or film 18 or the like, received in an adjustable slide rack 19 located intermediate the reflector 15 and lens 17, is projected by the reflected light.

In operation, the improved lens should be positioned within the focal length of the concavely curved surface of the reflector 15 between the light source 16 and the reflector and centered with respect to the light source; and to enable placement of the improved lens 6 and the light source 16 out of the path of the light to be reflected through the image producing zone 20, the reflector 15 is placed at an angle to the vertical as shown. With the parts thus positioned and with the light 16 turned on, the slide 18 or the like bearing the image desired to be projected is placed in the rack 19 which may be adjusted axially of the reflected light passing through the image producing zone 20 until the proper focus is obtained. The light rays, shown diagrammatically by light lines, pass from the source 16 through the lens body 6 being intensified and directed uniformly by the improved plano-convex lens, in a manner to be hereinafter more fully described, against the surface of the reflector 15 flooding the same. Because the entire reflector surface is uniformly flooded with intensified light directed thereagainst by the lens 6, the light rays reflected as a beam from the reflector 15 travel approximately parallel, as outlined diagrammatically by light lines, through the image producing zone 20 and slide 18 and then through the projecting lens 17 against the screen or other object, not shown, against which it is desired to project the image or other material on the slide.

In actual use, my improved plano-convex lens has produced excellent results, obviating the disadvantages attendant the use of ordinary convex curved-surfaced lenses. It has been found that the flats or facets 9, 10 direct the light rays passing through the lens body 6 at right angles to the respective flat surfaces 9, 10 as the rays leave the body, and the roundings or curved intersections 11, 12, which form the sector defining radii, as well as the intersections 13 simultaneously magnify or intensify the light rays projected therethrough, as shown diagrammatically by light lines in Fig. 2. Since the light rays are projected from the flats 9, 10 at right angles thereto, the improved lens may be positioned and maintained a safe distance away from the light source 16 without resultant condensation of the light rays projected therefrom; and as long as the plano-convex lens is maintained within the focal length of the reflector and is centered with respect to the light source, the reflector surface will be completely flooded over its entire area with intensified light.

While excellent results have been obtained with a plano-convex lens having the outer flats 10 thereof disposed at an angle of approximately twenty-five degrees with respect to the plane surface 7 and with the inner flats disposed at an angle of approximately five degrees with respect to the plane surface 7, it has been found that these angles may be varied within ten degrees and still produce beneficial results. Likewise, while the inner annular series of flats 9 has been shown as comprising four in number with the outer annular series of flats 10 as comprising eight, beneficial results can nevertheless be produced with lenses having from three to six inner flats 9 and from six to ten outer flats 10. It is, however, important to maintain this ratio of approximately twice the number of outer flat surfaces to the inner flat surfaces in order to obtain utmost uniformity of light projected therethrough over the entire screen without resultant blind or bright spots; and it has also been found that by maintaining this ratio in the number of outer and inner flats as well as the above-indicated relative angularities thereof, the focal length of the lens is lengthened to a maximum while the intensity of the projected light is also enhanced and more uniformly distributed over the entire desired area.

From the foregoing detailed description, it is apparent that the present invention provides an improved simple, durable and compact lens which is highly efficient and especially useful for most effectively projecting and directing light rays toward the reflector of a film projector or like device. The improved lens may be readily manufactured of any suitable transparent material and may be produced in various sizes for use with projectors of different sizes. The invention has proven highly successful in actual use, and lenses manufactured in accordance with the invention have been found to produce great magnification or intensification of light directed with maximum efficiency and uniformity against the reflector or screen to project extremely clear images for long distances without the necessity of increasing either the size of the film or the reflector, and these resultant advantages may be obtained while maintaining the lens a safe distance away from the hot light 16. Since long range projection may be obtained at low cost through the use of the improved plano-convex lens, it is highly beneficial to the moving picture industry, providing means for increasing the light source in both outdoor and indoor theaters; and it is also useful as an aid in projecting images against trees, buildings, low clouds and the like for advertising purposes.

It should be understood that it is not desired to limit this invention to the exact details of construction or to the precise mode of use, herein shown and described, for various modifications within the scope of the appended claims may occur to persons skilled in the art.

I claim:

1. A lens comprising, a clear transparent body having a convex area on one side thereof, said convex area comprising an inner annular series of substantially flat sector-shaped surfaces and a separate outer annular series of twice the number of substantially flat sector-shaped surfaces disposed at an angle relative to the flat surfaces of said inner annular series, the radii defining the flat sector-shaped surfaces of said outer series being of greater length than the radii defining the sector-shaped surfaces of said inner series and all of the sector-defining radii being convexly transversely rounded.

2. A lens comprising, a clear transparent body having a convex area on one side thereof, said convex area comprising an inner annular series of substantially flat sector-shaped surfaces disposed at an angle of zero to ten degrees with respect to a plane perpendicular to the central lens axis and a separate outer annular series of about twice the number of substantially flat sector-shaped surfaces disposed at an angle of twenty to thirty degrees with respect to a plane perpendicular to the central lens axis, the radii defining the flat sector-shaped surfaces of said outer series being of greater length than the radii defining the sector-shaped surfaces of said inner series and all of the sector-defining radii being convexly transversely rounded.

HENRY WALDER.

REFERENCES CITED

The following references are of record in the file of this patent:

UNITED STATES PATENTS

| Number | Name | Date |
| --- | --- | --- |
| 1,276,648 | Guild | Aug. 20, 1918 |
| 1,298,084 | Nicols | Mar. 25, 1919 |
| 1,696,431 | Crockett | Dec. 25, 1928 |
| 1,739,607 | Oberg et al. | Dec. 17, 1929 |
| 1,847,134 | Nikonow | Mar. 1, 1932 |
| 1,990,390 | Rudy | Feb. 5, 1935 |

FOREIGN PATENTS

| Number | Country | Date |
| --- | --- | --- |
| 98,716 | Germany | Aug. 11, 1898 |
| 708,577 | France | May 4, 1931 |
| 809,747 | France | Dec. 21, 1936 |
| 7,695 of 1888 | Great Britain | Apr. 6, 1889 |
| 395 of 1900 | Great Britain | Jan. 5, 1901 |